US009632224B2

(12) United States Patent
Nielson et al.

(10) Patent No.: US 9,632,224 B2
(45) Date of Patent: Apr. 25, 2017

(54) BROADBAND, SELECTIVELY-ABSORPTIVE WIRE GRID POLARIZER

(71) Applicant: Moxtek, Inc., Orem, UT (US)

(72) Inventors: R. Stewart Nielson, Pleasant Grove, UT (US); Mathew Free, Orem, UT (US)

(73) Assignee: Moxtek, Inc., Orem, UT (US)

( * ) Notice: Subject to any disclaimer, the term of this patent is extended or adjusted under 35 U.S.C. 154(b) by 0 days.

(21) Appl. No.: 14/937,488

(22) Filed: Nov. 10, 2015

(65) Prior Publication Data

US 2016/0062017 A1 Mar. 3, 2016

Related U.S. Application Data

(63) Continuation-in-part of application No. 14/731,948, filed on Jun. 5, 2015.

(60) Provisional application No. 62/016,955, filed on Jun. 25, 2014, provisional application No. 62/104,371, filed on Jan. 16, 2015.

(51) Int. Cl.
*G02B 5/30* (2006.01)
*H04N 9/31* (2006.01)
*G03B 21/00* (2006.01)
*G03B 21/20* (2006.01)

(52) U.S. Cl.
CPC .......... *G02B 5/3058* (2013.01); *H04N 9/3167* (2013.01); *G03B 21/006* (2013.01); *G03B 21/2073* (2013.01)

(58) Field of Classification Search
CPC .. G03B 21/28; G03B 21/208; G03B 21/2073; G02B 27/283; G02B 27/286; G02B 27/4261
See application file for complete search history.

(56) References Cited

U.S. PATENT DOCUMENTS

| 4,763,972 | A | 8/1988 | Papuchon et al. |
| 7,113,335 | B2 | 9/2006 | Sales |
| 7,233,563 | B2 | 6/2007 | Ueki et al. |
| | | | (Continued) |

FOREIGN PATENT DOCUMENTS

| KR | 10-2011-0137256 A | 12/2011 |
| KR | 10-2012-0018750 A | 3/2012 |
| | (Continued) | |

OTHER PUBLICATIONS

U.S. Appl. No. 14/731,948, filed Jun. 5, 2015; R. Stewart Nielson.

*Primary Examiner* — Sultan Chowdhury
(74) *Attorney, Agent, or Firm* — Thorpe, North & Western, LLP

(57) ABSTRACT

The invention includes a selectively-absorptive wire grid polarizer (WGP) comprising an array of parallel, elongated rods located over a surface of a transparent substrate with gaps between adjacent rods. Each of the rods can include a reflective wire and two absorptive ribs. The reflective wire can be sandwiched between the two absorptive ribs and the substrate or the two absorptive ribs can be sandwiched between the reflective wire and the substrate. Each of the two absorptive ribs can comprise a different material. Use of multiple absorptive ribs within each rod can increase the effective useful bandwidth of light for selectively absorbing one polarization.

20 Claims, 4 Drawing Sheets

(56) References Cited

U.S. PATENT DOCUMENTS

| | | |
|---|---|---|
| 7,414,784 B2 | 8/2008 | Mi et al. |
| 7,813,039 B2 | 10/2010 | Perkins et al. |
| 7,961,393 B2 | 6/2011 | Perkins et al. |
| 8,049,841 B2 | 11/2011 | Sugita et al. |
| 8,611,007 B2 * | 12/2013 | Davis .................... B82Y 20/00 359/485.05 |
| 8,755,113 B2 | 6/2014 | Gardner et al. |
| 9,348,076 B2 | 5/2016 | Wang et al. |
| 9,354,374 B2 | 5/2016 | Wang et al. |
| 9,477,024 B2 | 10/2016 | Takahashi et al. |
| 2005/0185140 A1 * | 8/2005 | Matsubara ......... G02B 27/0994 353/20 |
| 2005/0275944 A1 | 12/2005 | Wang et al. |
| 2005/0277063 A1 | 12/2005 | Wang et al. |
| 2006/0274272 A1 * | 12/2006 | Yoshihide ........... G02F 1/13362 353/20 |
| 2007/0296921 A1 * | 12/2007 | Wang ................... G02B 5/3058 353/20 |
| 2008/0316599 A1 | 12/2008 | Wang et al. |
| 2009/0231702 A1 | 9/2009 | Wu et al. |
| 2011/0051092 A1 * | 3/2011 | Mashitani ............... G02B 27/26 353/8 |
| 2013/0286358 A1 * | 10/2013 | Takahashi ............ G02B 5/3058 353/20 |
| 2015/0077851 A1 | 3/2015 | Wang |
| 2015/0116824 A1 | 4/2015 | Wang et al. |
| 2015/0131150 A1 | 5/2015 | Probst et al. |

FOREIGN PATENT DOCUMENTS

| | | |
|---|---|---|
| KR | 10-2012-0040868 A | 4/2012 |
| KR | 10-2012-0047638 A | 5/2012 |

* cited by examiner

BROADBAND, SELECTIVELY-ABSORPTIVE WIRE GRID POLARIZER

CLAIM OF PRIORITY

This is a continuation-in-part of U.S. patent application Ser. No. 14/731,948, filed on Jun. 5, 2015, which claims priority to U.S. Provisional Patent Application No. 62/016,955, filed on Jun. 25, 2014; both of which are hereby incorporated herein by reference in their entirety. This claims priority to U.S. Provisional Patent Application No. 62/104,371, filed on Jan. 16, 2015, which is hereby incorporated herein by reference in its entirety.

FIELD OF THE INVENTION

The present application is related generally to selectively-absorptive wire grid polarizers, meaning that the polarizer is designed to substantially absorb one polarization and to substantially transmit an opposite polarization.

BACKGROUND

A selectively-absorptive wire grid polarizer (WGP) can include a rib of material that is absorptive in the wavelength range of interest. Because of the structure of the rib, the WGP can selectively absorb one polarization while allowing an opposite polarization to substantially transmit through the WGP.

The absorptive material used in a selectively-absorptive WGP can have a narrow band of effective absorption. Consequently, one WGP is typically designed for one narrow spectrum of light and another WGP is designed for another narrow spectrum of light. For example, three WGPs might be used to cover the visible spectrum of light (one WGP for red, another for green, and another for blue). It would be beneficial to both the user and the manufacturer of selectively-absorptive WGPs to absorb a larger bandwidth of light.

SUMMARY

It has been recognized that it would be advantageous to provide a selectively-absorptive wire grid polarizer (WGP) that can selectively absorb a relatively larger bandwidth of light. The present invention is directed to various embodiments of selectively-absorptive WGPs that satisfy this need.

The selectively-absorptive WGP can comprise an array of parallel, elongated rods located over a surface of a transparent substrate with gaps between adjacent rods. Each of the rods can include a reflective wire and two absorptive ribs. The reflective wire can be sandwiched between the two absorptive ribs and the substrate or the two absorptive ribs can be sandwiched between the reflective wire and the substrate. Each of the two absorptive ribs can comprise a different material.

BRIEF DESCRIPTION OF THE DRAWINGS

FIGS. 1-5 are schematic side views of selectively-absorptive wire grid polarizers (WGP) 10, 20, 30a, 30b, 40, and 50 with rods 14 located over a surface of a transparent substrate 11 and gaps 15 between adjacent rods 14, in accordance with embodiments of the present invention.

FIG. 1 is a schematic cross-sectional side view of a selectively-absorptive WGP 10, showing that each rod 14 can include a reflective wire 13 sandwiched between two absorptive ribs 12 and the substrate 11.

FIG. 2 is a schematic perspective view of a selectively-absorptive WGP 20, showing that each rod 14 can include two absorptive ribs 12 sandwiched between a reflective wire 13 and a substrate 11.

FIG. 4 is a schematic cross-sectional side view of a selectively-absorptive WGP 40 with a third absorptive rib $12_c$ in each rod 14, showing that each rod 14 can include a reflective wire 13 and three, adjoining absorptive ribs 12. The reflective wire 13 can be sandwiched between the three absorptive ribs 12 and the substrate 11, as shown. Alternatively, the three absorptive ribs 12 can be sandwiched between the reflective wire 13 the substrate 11, similar WGP 20, but with three absorptive ribs 12.

FIG. 5 is a schematic cross-sectional side view of a selectively-absorptive WGP 50, showing that each rod 14 can include a layer L sandwiched between two absorptive ribs 12 and the reflective wire 13. The reflective wire 13 can be located closer to the substrate 11 than the absorptive ribs 12, as shown, or the absorptive ribs 12 can be located closer to the substrate than the reflective wire, similar to WGP 20.

DEFINITIONS

Figure 1:
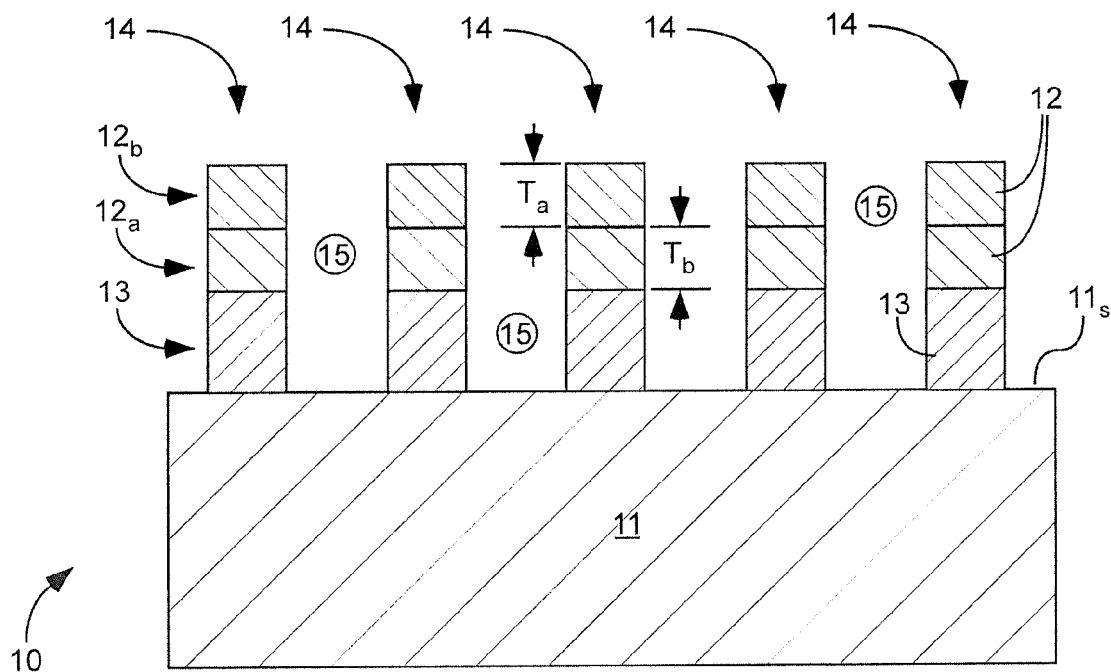
Figure 2:
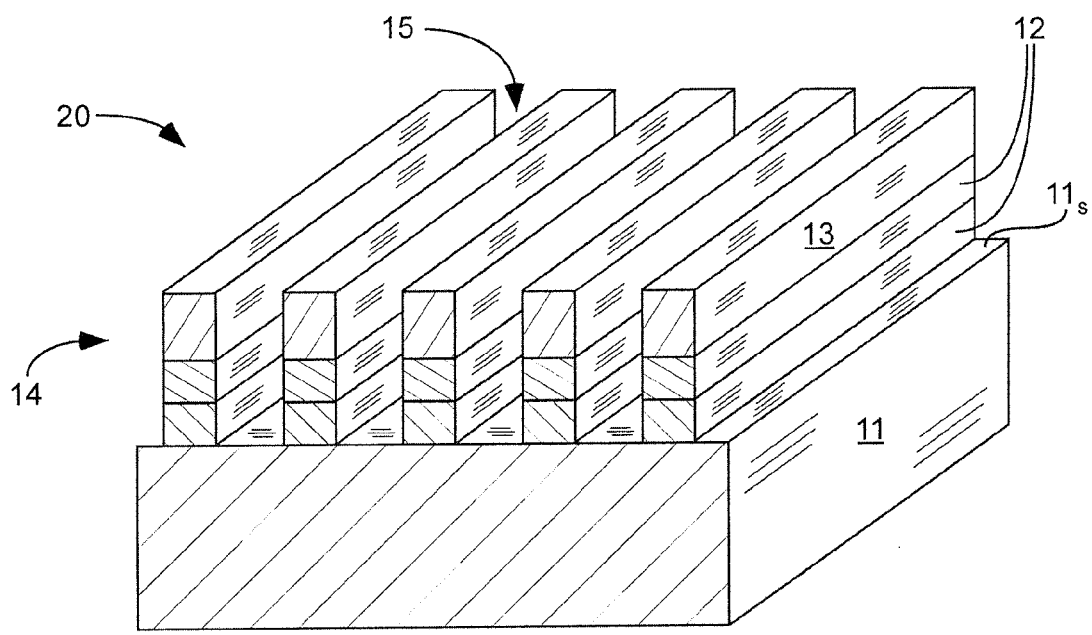

Many materials used in optical structures absorb some light, reflect some light, and transmit some light. The following definitions are intended to distinguish between materials or structures that are primarily absorptive, primarily reflective, or primarily transparent.

1. As used herein, the term "absorptive" means substantially absorptive of light in the wavelength of interest.
   a. Whether a material is "absorptive" is relative to other materials used in the polarizer. Thus, an absorptive structure will absorb substantially more than a reflective or a transparent structure.
   b. Whether a material is "absorptive" is dependent on the wavelength of interest. A material can be absorptive in one wavelength range but not in another.
   c. In one aspect, an absorptive structure can absorb greater than 40% and reflect less than 60% of light in the wavelength of interest (assuming the absorptive structure is an optically thick film—i.e. greater than the skin depth thickness).
   d. In another aspect, an absorptive material can have a high extinction coefficient (k), relative to a transparent material, such as for example greater than 0.01 in one aspect or greater than 1.0 in another aspect.
   e. Absorptive ribs can be used for selectively absorbing one polarization of light.
2. As used herein, the term "reflective" means substantially reflective of light in the wavelength of interest.
   a. Whether a material is "reflective" is relative to other materials used in the polarizer. Thus, a reflective structure will reflect substantially more than an absorptive or a transparent structure.

b. Whether a material is "reflective" is dependent on the wavelength of interest. A material can be reflective in one wavelength range but not in another. Some wavelength ranges can effectively utilize highly reflective materials. At other wavelength ranges, especially lower wavelengths where material degradation is more likely to occur, the choice of materials may be more limited and an optical designer may need to accept materials with a lower reflectance than desired.

c. In one aspect, a reflective structure can reflect greater than 80% and absorb less than 20% of light in the wavelength of interest (assuming the reflective structure is an optically thick film—i.e. greater than the skin depth thickness).

d. Metals are often used as reflective materials.

e. Reflective wires can be used for separating one polarization of light from an opposite polarization of light.

3. As used herein, the term "transparent" means substantially transparent to light in the wavelength of interest.

a. Whether a material is "transparent" is relative to other materials used in the polarizer. Thus, a transparent structure will transmit substantially more than an absorptive or a reflective structure.

b. Whether a material is "transparent" is dependent on the wavelength of interest. A material can be transparent in one wavelength range but not in another.

c. In one aspect, a transparent structure can transmit greater than 90% and absorb less than 10% of light at the wavelength of interest or wavelength range of use, ignoring Fresnel reflection losses.

d. In another aspect, a transparent structure can have an extinction coefficient (k) of less than 0.01, less than 0.001, or less than 0.0001 in another aspect, at the wavelength of interest or wavelength range of use.

4. As used in these definitions, the term "material" refers to the overall material of a particular structure. Thus, a structure that is "absorptive" is made of a material that as a whole is substantially absorptive, even though the material may include some reflective or transparent components. Thus for example, a rib made of a sufficient amount of absorptive material so that it substantially absorbs light is an absorptive rib even though the rib may include some reflective or transparent material embedded therein.

As used herein, the term "light" means ultraviolet, visible, and infrared regions of the electromagnetic spectrum.

As used herein, the term "visible light spectrum" means electromagnetic radiation having wavelengths from 400 through 700 nanometers.

DETAILED DESCRIPTION

As illustrated in FIGS. 1-5, broadband, selectively-absorptive wire grid polarizers (WGP) 10, 20, 30a, 30b, 40, & 50 are shown comprising an array of parallel, elongated rods 14 located over a surface $11_s$ of a transparent substrate 11, with gaps 15 between adjacent rods 14. The gaps 15 can be filled with a gas, such as air, can be vacuum-filled, or can be filled with another material, such as for example a transparent dielectric.

Figure 3A:
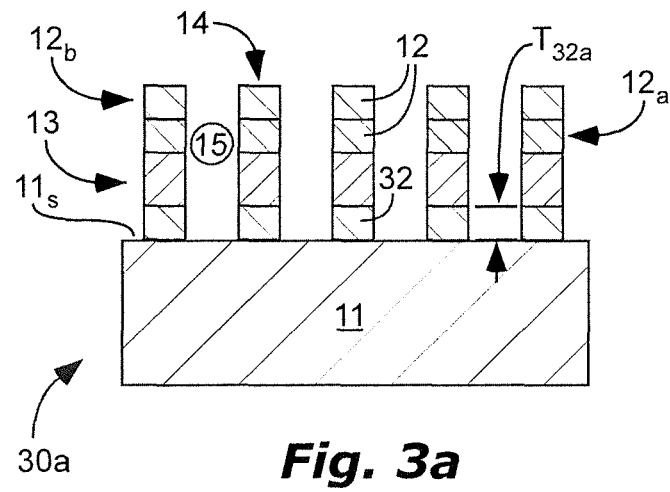
FIGS. 3a & 3b are schematic cross-sectional side views of selectively-absorptive WGPs 30a and 30b, showing that each rod 14 can include a reflective wire 13 sandwiched between two absorptive ribs 12 on one side and one or more absorptive rails 32 (FIG. 3a) or $32_a$ and $32_b$ (FIG. 3b) on an opposite side.
Figure 3B:
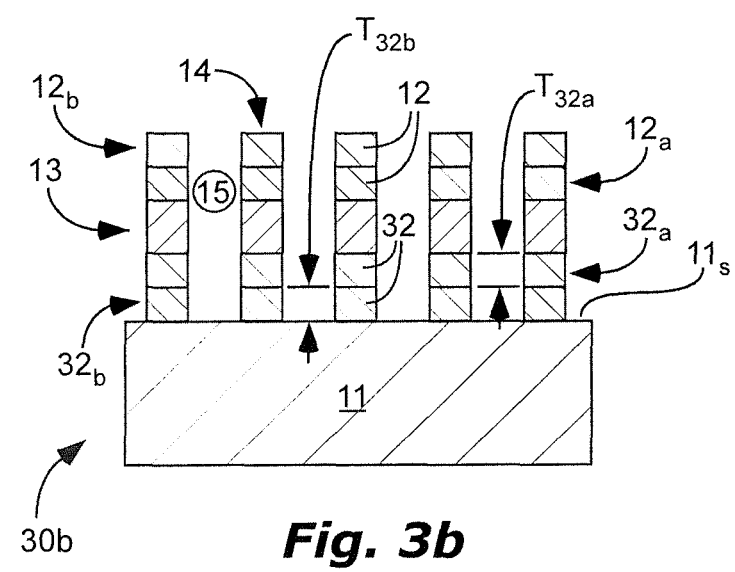

As shown on the selectively-absorptive WGPs 10 and 20, each of the rods 14 can include a reflective wire 13 and two absorptive ribs $12_a$ and $12_b$. As shown on WGP 30 in FIGS. 3a and 3b, each of the rods 14 can include a reflective wire 13, two absorptive ribs $12_a$ and $12_b$, and one or more absorptive rails 32 (FIG. 3a) or $32_a$ and $32_b$ (FIG. 3b). As shown on the selectively-absorptive WGP 40 in FIG. 4, each of the rods 14 can include a reflective wire 13 and three absorptive ribs $12_a$, $12_b$, and $12_c$. Although not shown in the figures, each of the rods 14 can include the reflective wire 13 and more than three absorptive ribs 12.

As shown on WGP 10 in FIG. 1, the reflective wire 13 can be sandwiched between the two absorptive ribs $12_a$ and $12_b$ and the substrate 11. As shown on WGP 20 in FIG. 2, the two absorptive ribs $12_a$ and $12_b$ can be sandwiched between the reflective wire 13 and the substrate 11. As shown on WGP 30a in FIG. 3a, the reflective wire 13 can be sandwiched between two absorptive ribs $12_a$ and $12_b$ on one side and an absorptive rail 32 on an opposite side. Although not shown in FIG. 3a, the two absorptive ribs $12_a$ and $12_b$ can be located closer to the substrate 11 and the single absorptive rail 32 can be located farther from the substrate 11, with the reflective wire 13 sandwiched between. As shown on WGP 30b in FIG. 3b, the reflective wire 13 can be sandwiched between two absorptive ribs $12_a$ and $12_b$ on one side and two absorptive rails $32_a$ and $32_b$ on an opposite side. The order of the reflective wire 13, the absorptive ribs 12, and the absorptive rails 32 can be the same for all rods 14 of a given WGP. There can be more than two absorptive ribs 12 and/or more than two absorptive rails 32.

WGP 10 may be preferred if light that should be absorbed impinges on the WGP 10 from the rod 14 side. WGP 20 may be preferred if light that should be absorbed impinges on the WGP 20 from the substrate 11 side. WGPs 30a and 30b may be preferred if light that should be absorbed impinges on the WGP 30 from both the top side and the bottom side, as described in U.S. patent application Ser. No. 14/731,948, filed on Jun. 5, 2015, incorporated herein by reference.

Figure 4:
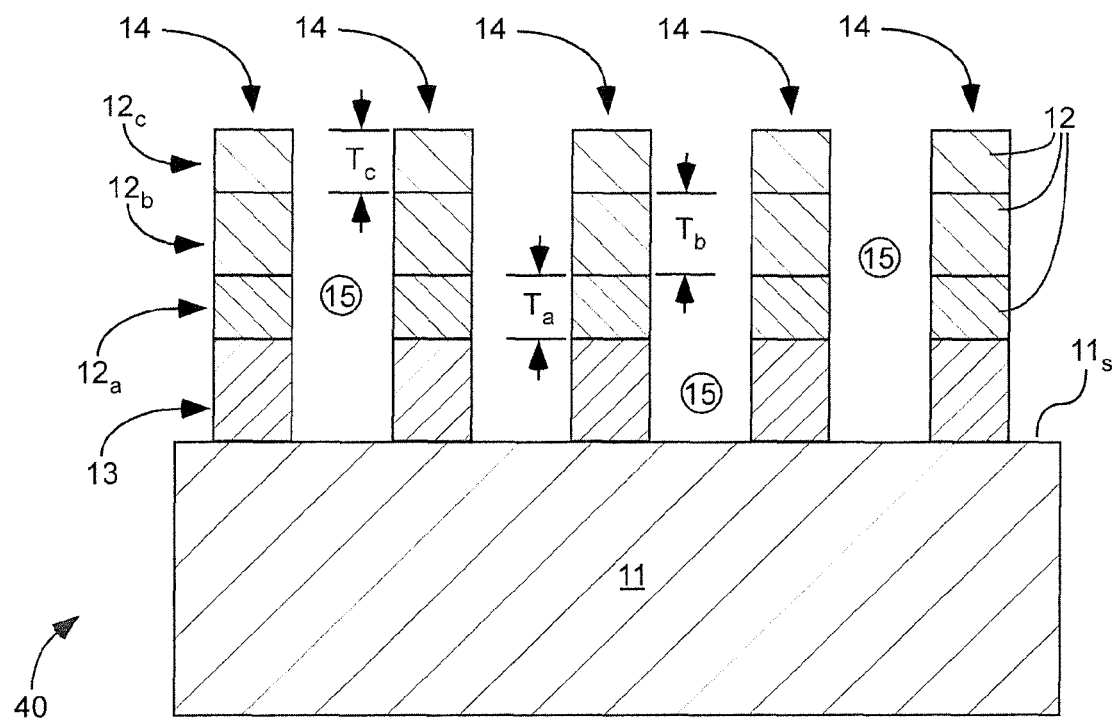

As shown on WGP 40 in FIG. 4, the reflective wire 13 can be sandwiched between three absorptive ribs $12_a$, $12_b$, & $12_c$ and the substrate 11. Although not shown in the figures, the three absorptive ribs $12_a$, $12_b$, & $12_c$ can be sandwiched between the reflective wire 13 and the substrate 11. Also not shown in the figures, the WGP can include three or more absorptive ribs 12 on one side of the reflective wire 13 and one or more rails 32 on an opposite side.

In order to broaden the useful wavelength range of light of the selectively-absorptive WGPs described herein, each of the absorptive ribs 12 can comprise a different material. Similarly, each of the two absorptive rails 32, if used, can comprise a different material. Material and thickness of one of the absorptive ribs 12 (or absorptive rail 32) can be selected for one wavelength range of light and the other absorptive rib(s) 12 (or absorptive rails 32) can be selected for another/other wavelength range(s) of light.

The two absorptive ribs $12_a$ & $12_b$ can include a first absorptive rib $12_a$ having a first material with a first thickness $T_a$ and a second absorptive rib $12_b$ having a second material with a second thickness $T_b$. The first material with the first thickness $T_a$ can have a reflectivity of light that is a minimum at a certain wavelength ($\lambda_1$). The second material with the second thickness $T_b$ can have a reflectivity of light that is a minimum at a certain a wavelength ($\lambda_2$). There can be a difference between these wavelengths $\lambda_1$ and $\lambda_2$ in order broaden the useful wavelength range of light.

For example, the first absorptive rib $12_a$ can be made substantially of germanium and the second absorptive rib $12_b$ can be made substantially of silicon. In the wavelength range shown in Table 1, the first absorptive rib $12_a$, with a first thickness $T_a$ of 20 nanometers (nm), has a reflectivity $Rs_a$ of light that is a minimum (3.0) at a wavelength ($\lambda_1$) of 630 nm; and the second absorptive rib $12_b$, with a second thickness $T_b$ of 12 nm, has a reflectivity $Rs_b$ of light that is a minimum (0.3) at a wavelength ($\lambda_2$) of 480 nm. A difference between these two wavelengths $\lambda_1$ and $\lambda_2$ is 150 nm ($|\lambda_1-\lambda_2|=|630$ nm$-480$ nm$|=150$ nm). By combining a germanium rib and a silicon rib in the same selectively-absorptive WGP, the useful wavelength range of light can be broadened.

TABLE 1

| Wavelength (nanometers) | Germanium $Rs_a$ | Silicon $Rs_b$ |
|---|---|---|
| 360 | 20 | 12 |
| 390 | 20 | 8.9 |
| 420 | 19 | 4.7 |
| 450 | 17 | 1.1 |
| 480 | 15 | 0.3 |
| 510 | 12 | 4.7 |
| 540 | 9.1 | 15 |
| 570 | 6.4 | 27 |
| 600 | 4.2 | 39 |
| 630 | 3.0 | 49 |
| 660 | 3.2 | 56 |
| 690 | 4.8 | 61 |
| 720 | 7.8 | 63 |
| 750 | 12 | 64 |
| 780 | 16 | 64 |
| 810 | 19 | 62 |

For optimal WGP use, it can be important to select materials and thicknesses for a proper difference between these two wavelengths $\lambda_1$ and $\lambda_2$. This difference can be different for each application of use. For example, a difference between the wavelength $\lambda_1$ at which the first absorptive rib $12_a$ has a minimum reflectivity and the wavelength $\lambda_2$ at which the second absorptive rib $12_b$ has a minimum reflectivity can be greater than 50 nm in one aspect (50 nm$<|\lambda_1-\lambda_2|$) greater than 100 nm in another aspect (100 nm$<|\lambda_1-\lambda_2|$), between 50 nm and 300 nm in another aspect (50 nm$<|\lambda_1-\lambda_2|<300$ nm), or between 200 nm and 1000 nm in another aspect (200 nm$<|\lambda_1-\lambda_2|<1000$ nm).

In order to broaden even more the useful wavelength range of light of the selectively-absorptive WGPs described herein, each of the rods 14 can further comprise more than two absorptive ribs 12. For example, WGP 40 in FIG. 4 shows rods 14 with a reflective wire 13 and three absorptive ribs 12, including a first absorptive rib $12_a$, a second absorptive rib $12_b$, and a third absorptive rib $12_c$. Each of the three absorptive ribs 12 on WGP 50 can comprise a different material. Material and thicknesses of the absorptive ribs 12 can be selected such that each absorptive rib 12 is optimized for a different wavelength range of light. Similar to the first absorptive rib $12_a$ and the second absorptive rib $12_b$, the third absorptive rib $12_c$ can have a third material with a third thickness $T_c$. An example thickness $T_a$, $T_b$, & $T_c$ of the absorptive ribs 12 is between 5 and 40 nanometers.

The third material with the third thickness $T_c$ can have a reflectivity of light that is a minimum at a certain wavelength ($\lambda_3$). There can be a difference between the wavelengths $\lambda_1$, $\lambda_2$, and $\lambda_3$, where reflectivity Rs is minimum for each of the absorptive ribs 12, in order broaden the useful wavelength range of light. A difference between the wavelength $\lambda_3$ at which the third absorptive rib $12_a$ has a minimum reflectivity and the wavelength $\lambda_1$ at which the first absorptive rib $12_a$, and/or the wavelength $\lambda_2$ at which the second absorptive rib $12_b$, has a minimum reflectivity can be greater than 50 nm in one aspect (50 nm$<|\lambda_1-\lambda_3|$ and/or 50 nm$<|\lambda_2-\lambda_3|$), greater than 100 nm in another aspect (100 nm$<|\lambda_1-\lambda_3|$ and/or 100 nm$<|\lambda_2-\lambda_3|$), between 50 nm and 300 nm in another aspect (50 nm$<|\lambda_1-\lambda_3|<300$ and/or 50 nm$<|\lambda_2-\lambda_3|<300$ nm), or between 200 nm and 1000 nm in another aspect (200 nm$<|\lambda_1-\lambda_3|<1000$ nm and/or 200 nm$<|\lambda_2-\lambda_3|<1000$ nm).

If multiple absorptive rails 32 are used, as shown in FIG. 3b, the absorptive rails 32 can include a first absorptive rail $32_a$ having a first rail material with a first rail thickness $T_{32a}$ and a second absorptive rail having a second rail material with a second rail thickness $T_{32b}$. The first rail material with the first rail thickness $T_{32a}$ can have a reflectivity of light that is a minimum at a certain wavelength ($\lambda_{rail1}$). The second rail material with the second rail thickness $T_{32b}$ can have a reflectivity of light that is a minimum at a certain a wavelength ($\lambda_{rail2}$). There can be a difference between these wavelengths $\lambda_{rail1}$ and $\lambda_{rail2}$ in order broaden the useful wavelength range of light.

A difference between the wavelength $\lambda_{rail1}$ at which the first absorptive $32_a$ has a minimum reflectivity and the wavelength $\lambda_{rail2}$ at which the second absorptive rail $32_b$ has a minimum reflectivity can be greater than 50 nm in one aspect (50 nm$<|\lambda_{rail1}-\lambda_{rail2}|$), greater than 100 nm in another aspect (100 nm$<|\lambda_{rail1}-\lambda_{rail2}|$), between 50 nm and 300 nm in another aspect (50 nm$<|\lambda_{rail1}-\lambda_{rail2}|<300$ nm), or between 200 nm and 1000 nm in another aspect (200 nm$<|\lambda_{rail1}-\lambda_{rail2}|<1000$ nm).

The minimum reflectivities described above can be the absolute minimum reflectivity for the respective material and thickness anywhere in the ultraviolet, visible, and infrared spectrums, or can be defined as the minimum reflectivity within a certain wavelength range of interest, such as for example in a wavelength range of 400 through 700 nanometers. A desired difference between minimum reflectivities can vary depending on the application of use.

The absorptive rib 12 structure and the absorptive rail 32 structure can be mirror images of each other. For example, the first absorptive rib $12_a$ can be located closer to the reflective wire 13 than the second absorptive rib $12_b$ and the first absorptive rail $32_a$ can be located closer to the reflective wire 13 than the second absorptive rail $32_b$; the first absorptive rail $32_a$ can be made of substantially the same material as the first absorptive rib $12_a$; and the second absorptive rail $32_b$ can be made of substantially the same material as the second absorptive rib $12_b$.

Figure 5:
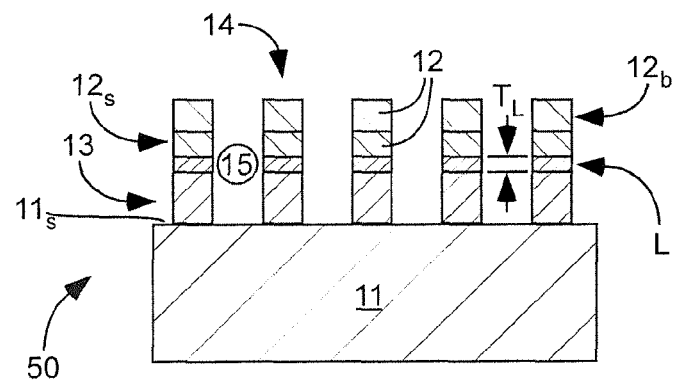

A specific example of a broadband, selectively-absorptive WGP 50 is shown in FIG. 5. One of the two absorptive ribs, called a silicon absorptive rib $12_s$ can comprise a mass percent of at least 80% silicon. The silicon absorptive rib $12_s$ can be sandwiched between another absorptive rib $12_b$ (second absorptive rib $12_b$) and the reflective wire 13. The silicon absorptive rib $12_s$ can be located closer to the reflective wire 13 than any other absorptive rib 12. The silicon absorptive rib $12_s$ can abut the reflective wire 13, surface to surface, or a layer of material L can be sandwiched between the silicon absorptive rib $12_s$ and the reflective wire 13. The layer of material L can act as a barrier layer to prevent migration of atoms between the silicon absorptive rib $12_s$ and the reflective wire 13. In one aspect, the layer of material L can have a thickness of between 0.5 and 10 nanometers. The layer of material L can be made of a transparent material, and thus can be called a transparent layer. Examples of materials of the layer of material L include aluminum dioxide and silicon dioxide.

Examples of materials of the absorptive ribs 12 and the absorptive rails 32 include silicon, germanium, and tantalum. Each pair of absorptive rib 12 or absorptive rail 32 can include a combination of these and other materials. The absorptive ribs 12 or the absorptive rails 32 can each include a high percent of a single element, such as for example a mass percent of at least 80% silicon, at least 80% germanium, or at least 80% tantalum. For example, one of the absorptive ribs 12/absorptive rails 32 can include a mass percent of at least 80% silicon and another absorptive rib 12/absorptive rail 32 can include a mass percent of at least 80% tantalum. This combination can provide a broadband, selectively-absorptive WGP.

One example of broadband performance is that the WGPs 10, 20, 30a, 30b, 40, and 50 can, across a bandwidth of at least 200 nanometers (or at least 150 nanometers or at least 300 nanometers) within the visible light spectrum, transmit at least 85% of one polarization (e.g p-polarized light), transmit less than 1.5% (or less than 1% or less than 0.5%) of an opposite polarization (e.g s-polarized light), and reflect less than 15% of the opposite polarization (e.g s-polarized light). Another example of broadband performance is that the WGPs 10, 20, 30a, 30b, 40, and 50 can, across a bandwidth of at least 200 nanometers (or at least 150 nanometers or at least 300 nanometers) within the visible light spectrum, transmit at least 80% of one polarization (e.g p-polarized light), transmit less than 0.15% of an opposite polarization (e.g s-polarized light), and reflect less than 15% of the opposite polarization (e.g s-polarized light). In these examples, the percent transmitted, reflected, or absorbed is the percent of that polarization, not the percent of all light impinging on the WGP.

Figure 6:
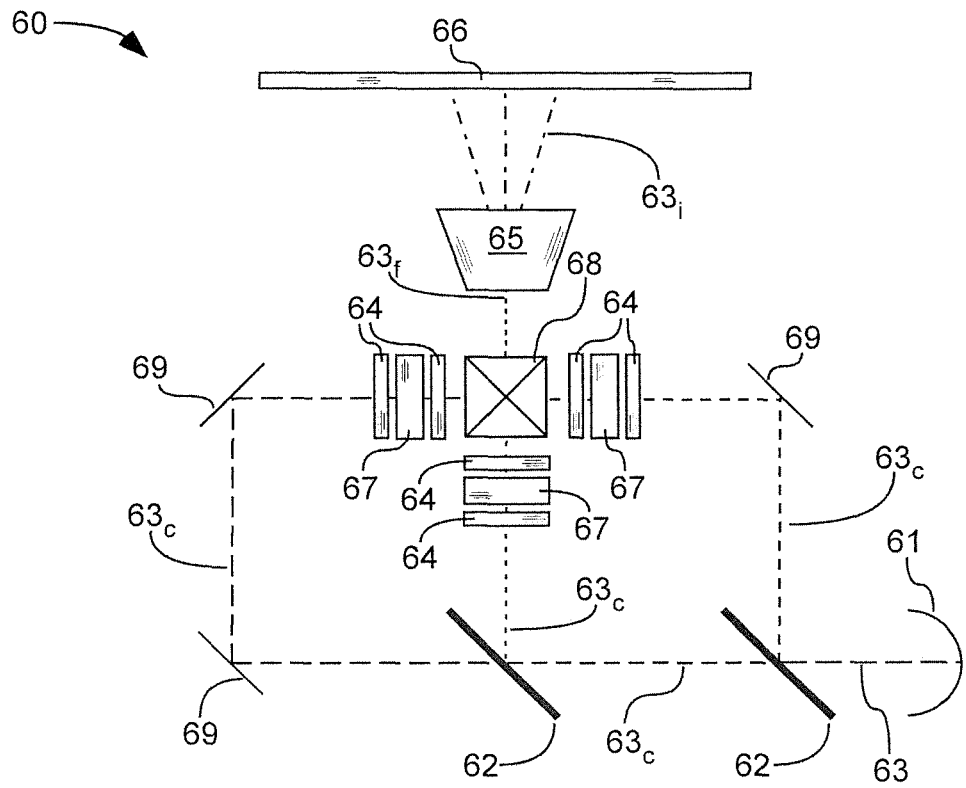
FIGS. 6-7 are schematic views of image projectors 60 and 70, each with broadband, selectively-absorptive WGP(s) 64 like the design(s) of WGPs 10, 20, 30a, 30b, 40, and 50 described, in accordance with embodiments of the present invention.

The WGPs 10, 20, 30a, 30b, 40, and 50 described herein can be used in an image projector. Image projector 60, shown in FIG. 6, can comprise a light source 61, color-splitting optics 62, color-combining optics 68, a projection lens system 65, one or more spatial light modulators 67, and one or more WGPs 64.

The light source 61 can emit a beam of light 63, which can initially be unpolarized. The color-splitting optics 62 can be located to receive at least part of the beam of light 63 and can split the beam of light 63 into multiple, differently-colored light beams (colored beams) $63_c$. The colored beams $63_c$ can be primary colors.

Color-combining optics 68 can be located to receive and can recombine at least some of the colored beams $63_c$ into a combined beam or final beam $63_f$. Color-combining optics 68 are sometimes called X-Cubes, X-Cube prisms, X-prisms, light recombination prisms, or cross dichroic prisms. Color-combining optics 68 are commonly used in computer projectors for combining different colors of light into a single image to be projected. X-Cubes are typically made of four right angle prisms, with dichroic coatings, that are cemented together to form a cube.

The projection lens system 65 can be located to receive the combined beam $63_f$ and can project a colored image $63_i$ onto a screen 66. Projection lens systems 65 are described in U.S. Pat. Nos. 6,585,378 and 6,447,120, which are hereby incorporated herein by reference in their entirety.

One spatial light modulator 67 can be located to receive, in each light path between the color-splitting optics 62 and the color-combining optics 68, one of the colored beams $63_c$. Each spatial light modulator 67 can have a plurality of pixels. Each pixel can receive a signal. The signal can be an electronic signal. Depending on whether or not each pixel receives the signal, the pixel can rotate a polarization of, or transmit or reflect without causing a change in polarization of, incident light. The spatial light modulator(s) 67 can be a liquid crystal device/display (LCD) and can be transmissive, reflective, or transflective.

Each WGP 64, according to one of the WGP designs described herein, can be located in one of the colored beams $63_c$ prior to entering the spatial light modulator 67, after exiting the spatial light modulator 67, or both. The WGP(s) 64 help form the colored image $63_i$ by transmitting, reflecting, or absorbing light of each pixel depending on the type of WGP 64 and whether each pixel received the signal.

Figure 7:
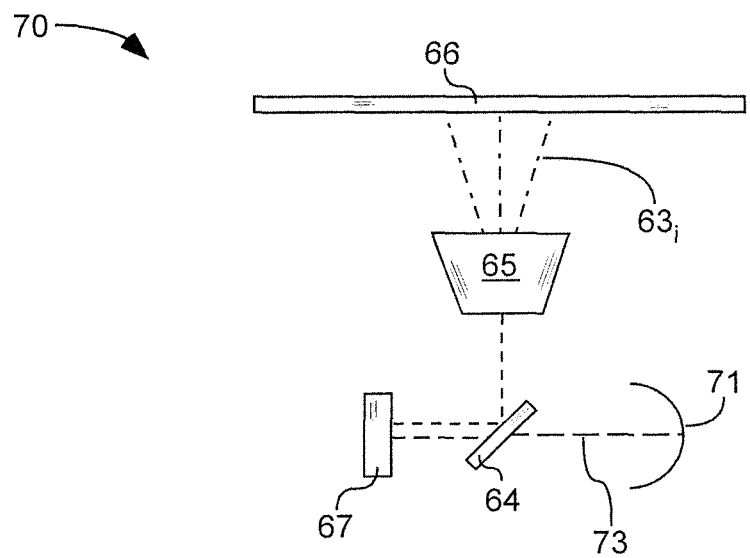

Another type of image projector 70 is shown in FIG. 7, and can comprise a light source 71, a projection lens system 65, a spatial light modulator 67, and a WGP 64. The light source 71 can sequentially emit multiple, differently-colored light beams (colored beams) 73. The multiple, differently-colored light beams can be primary colors. The projection lens system 65 can be located to receive the colored beams 73 and can project a colored image $63_i$ onto a screen 66. The projection lens system 65, spatial light modulator 67, WGP 64, colored image $63_i$, and screen 66 were described above.

The spatial light modulator 67 can be located to receive, in a light path between the light source 71 and the projection lens system 65, the colored beams 73. The WGP 64 can be located in the colored beams 73 prior to entering the spatial light modulator 67 and after exiting the spatial light modulator 67.

What is claimed is:

1. A broadband, selectively-absorptive wire grid polarizer (WGP) comprising an array of parallel, elongated rods located over a surface of a transparent substrate with gaps between adjacent rods, each of the rods including a reflective wire and two absorptive ribs, wherein:
   a. the reflective wire is sandwiched between the two absorptive ribs and the substrate or the two absorptive ribs are sandwiched between the reflective wire and the substrate;
   b. each of the two absorptive ribs comprises a different material;
   c. the two absorptive ribs include a first absorptive rib having a first material with a first thickness and a second absorptive rib having a second material with a second thickness;
   d. the first material with the first thickness has a wavelength ($\lambda_1$) with a minimum reflectivity of light;
   e. the second material with the second thickness has a wavelength ($\lambda_2$) with a minimum reflectivity of light; and
   f. 50 nanometers$<|\lambda_1-\lambda_2|$.

2. The WGP of claim 1, wherein each of the rods further comprise a third absorptive rib, and wherein:
   a. the two absorptive ribs and the third absorptive rib define three absorptive ribs;
   b. the reflective wire is sandwiched between the three absorptive ribs and the substrate or the three absorptive ribs are sandwiched between the reflective wire and the substrate;
   c. the third absorptive rib has a third material with a third thickness;
   d. the third material with the third thickness has a wavelength ($\lambda_3$) with a minimum reflectivity of light;
   e. 50 nanometers$<|\lambda_1-\lambda_3|$; and
   f. 50 nanometers$<|\lambda_1-\lambda_3|$.

3. The WGP of claim 1, wherein a thickness of each of the two absorptive ribs is between 5 and 40 nanometers.

4. The WGP of claim 1, wherein:
   a. one of the two absorptive ribs comprises a mass percent of at least 80% silicon, defining a silicon absorptive rib;
   b. the silicon absorptive rib is sandwiched between the other of the two absorptive ribs and the reflective wire;
   c. the WGP further comprises a transparent layer sandwiched between the silicon absorptive rib and the reflective wire; and d. the transparent layer has a thickness of between 0.5 and 10 nanometers.

5. The WGP of claim 1, wherein each of the rods further comprise an absorptive rail, and wherein the reflective wire is sandwiched between the absorptive rail on one side and the two absorptive ribs on an opposite side.

6. The WGP of claim 5, wherein:
100 nanometers<$|\lambda_1-\lambda_2|$.

7. The WGP of claim 1, wherein each of the rods further comprise two absorptive rails, and wherein:
 a. the reflective wire is sandwiched between the two absorptive rails on one side and two absorptive ribs on an opposite side;
 b. each of the two absorptive rails comprise a different material;
 c. the two absorptive rails include a first absorptive rail having a first rail material with a first rail thickness and a second absorptive rail having a second rail material with a second rail thickness;
 d. the first rail material with the first rail thickness has a wavelength ($\lambda_{rail1}$) with a minimum reflectivity of light;
 e. the second rail material with the second rail thickness has a wavelength ($\lambda_{rail2}$) with a minimum reflectivity of light; and
 f. 50 nanometers<$|\lambda_{rail1}-\lambda_{rail2}|$.

8. The WGP of claim 1, wherein:
$|\lambda_1-\lambda_2|$<300 nanometers.

9. The WGP of claim 8, further comprising a layer, wherein:
 a. one of the two absorptive ribs comprises a mass percent of at least 80% silicon, defining a silicon absorptive rib;
 b. the silicon absorptive rib is sandwiched between the other of the two absorptive ribs and the reflective wire;
 c. the layer is sandwiched between the silicon absorptive rib and the reflective wire;
 d. the layer includes aluminum dioxide, silicon dioxide, or combinations thereof; and
 e. the layer has a thickness of between 0.5 and 10 nanometers.

10. The WGP of claim 8, wherein one of the two absorptive ribs comprises germanium.

11. The WGP of claim 1, wherein:
200 nanometers<$|\lambda_1-\lambda_2|$<1000 nanometers.

12. The WGP of claim 11, wherein:
 a. one of the two absorptive ribs comprises a mass percent of at least 80% silicon, defining a silicon absorptive rib;
 b. the silicon absorptive rib is sandwiched between the other of the two absorptive ribs and the reflective wire;
 c. the WGP further comprises a transparent layer sandwiched between the silicon absorptive rib and the reflective wire; and
 d. the transparent layer has a thickness of between 0.5 and 10 nanometers.

13. The WGP of claim 11, wherein one of the two absorptive ribs comprises germanium.

14. The WGP of claim 1, wherein one of the two absorptive ribs comprises germanium.

15. A broadband, selectively-absorptive wire grid polarizer (WGP) comprising array of parallel, elongated rods located over a surface of a transparent substrate with gaps between adjacent rods, each of the rods including a reflective wire and three absorptive ribs, and wherein:
 a. each of the three absorptive ribs comprises a different material; and
 b. the reflective wire is sandwiched between the three absorptive ribs and the substrate or the three absorptive ribs are sandwiched between the reflective wire and the substrate.

16. The WGP of claim 15, wherein:
 a. the three absorptive ribs include a first absorptive rib having a first material with a first thickness, a second absorptive rib having a second material with a second thickness, and the third absorptive rib having a third material with a third thickness;
 b. the first material with the first thickness has a wavelength ($\lambda_1$) with a minimum reflectivity of light;
 c. the second material with the second thickness has a wavelength ($\lambda_2$) with a minimum reflectivity of light;
 d. the third material with the third thickness has a wavelength ($\lambda_3$) with a minimum reflectivity of light;
 e. 50 nanometers<$|\lambda_1-\lambda_2|$<300 nanometers;
 f. 50 nanometers<$|\lambda_2-\lambda_3|$<300 nanometers;
 g. 50 nanometers<$|\lambda_1-\lambda_3|$<.

17. A broadband, selectively-absorptive wire grid polarizer (WGP) comprising a transparent layer, a transparent substrate, an array of parallel, elongated rods located over a surface of the transparent substrate with gaps between adjacent rods, each of the rods including a reflective wire and two absorptive ribs, wherein:
 a. the reflective wire is sandwiched between the two absorptive ribs and the substrate or the two absorptive ribs are sandwiched between the reflective wire and the substrate;
 b. the transparent layer is sandwiched between the reflective wire and the two absorptive ribs;
 c. each of the two absorptive ribs comprises a different material;
 d. the two absorptive ribs include a first absorptive rib having a first material with a first thickness and a second absorptive rib having a second material with a second thickness;
 e. the first material with the first thickness has a wavelength ($\lambda_1$) with a minimum reflectivity of light;
 f. the second material with the second thickness has a wavelength ($\lambda_2$) with a minimum reflectivity of light;
 g. 50 nanometers<$|\lambda_1-\lambda_2|$<.

18. The WGP of claim 17, wherein one of the two absorptive ribs comprises germanium.

19. The WGP of claim 17, wherein the transparent layer has a thickness of between 0.5 and 10 nanometers.

20. The WGP of claim 17, wherein $|\lambda_1-\lambda_2|$<300 nanometers.

* * * * *